Oct. 6, 1970  F. KRUMBEIN  3,532,294
FILM PROJECTOR

Filed May 29, 1968  2 Sheets-Sheet 1

INVENTOR.
Fritz Krumbein
BY Singer, Stern & Carlberg
Attorneys

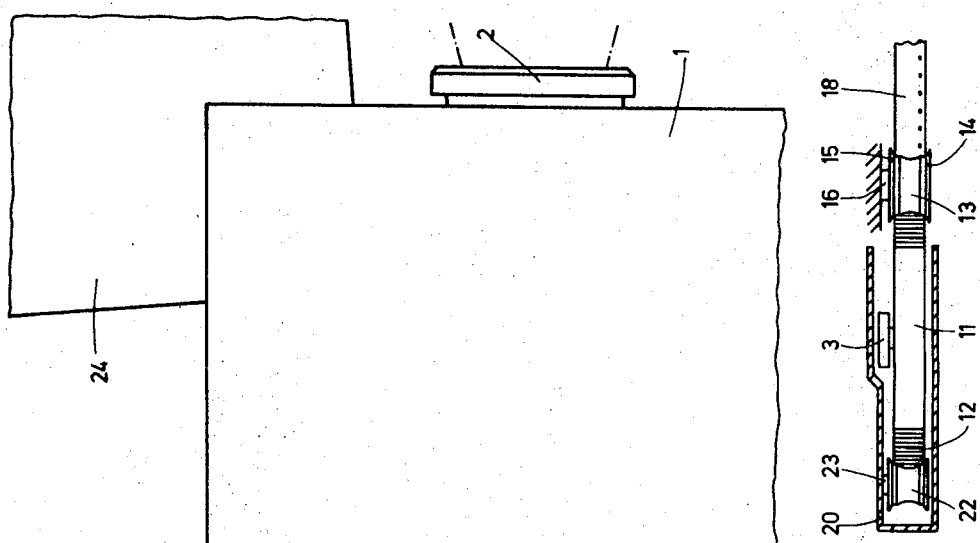
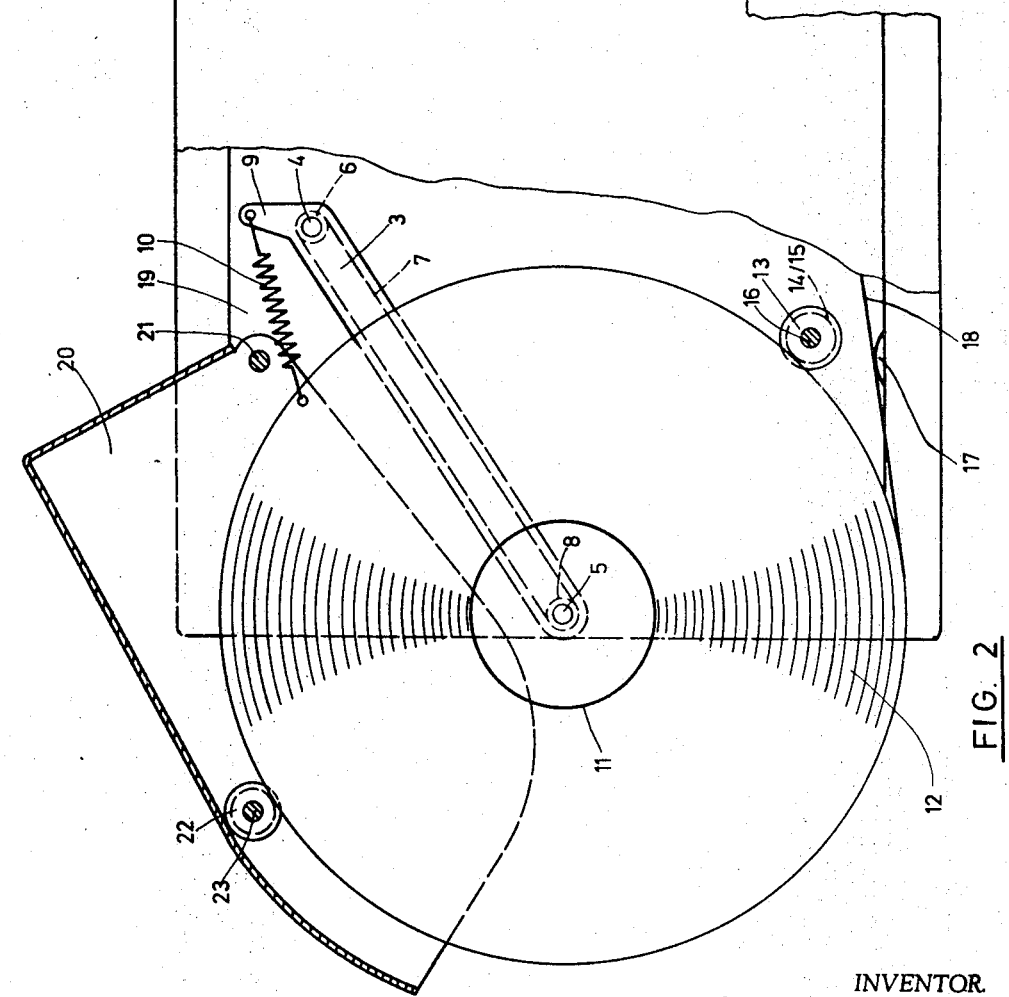

United States Patent Office 3,532,294
Patented Oct. 6, 1970

3,532,294
FILM PROJECTOR
Fritz Krumbein, Stuttgart-Mohringen, Germany, assignor to Zeiss Ikon Aktiengesellschaft, Stuttgart, Germany, a corporation of Germany
Filed May 29, 1968, Ser. No. 733,043
Claims priority, application Germany, June 10, 1967, Z 12,883
Int. Cl. G03b *1/04;* G11b *23/02*
U.S. Cl. 242—210
3 Claims

ABSTRACT OF THE DISCLOSURE

A film projector of compact construction in which the pivotally mounted supporting arm for the take-up core of the film strip is arranged entirely within the projector housing. The film winding formed on the take-up core engages a stationary abutment roller so that the supporting arm is pivotally moved when the diameter of the film winding increases. Another roller on a pivoted flap which normally covers a slot in the projector housing in which slot the film winding is formed is also engaged by the film winding so that the flap is opened by the film winding when the diameter of the same increases.

---

The invention relates to a film projector provided with a rewinding device for the film.

Known projectors of this type are equipped with reel arms which may be pivoted from a rest position for the transportation of the projector into a position for the projection of the film. This makes these projectors relatively small and handy.

Setting such a projector up for projection requires several manipulatory steps. Also the automatic threading of the film onto the core of the take-up reel is mostly rather difficult and requires considerable technical structure.

Particularly annoying are the necessary manipulations when in keeping with the present day automation of the projection also here film cartridges are to be used. A cartridge projector should be ready for projection by merely attaching the film cartridge to it. In order to avoid the additional pivotal movement of the reel arm, the shaft of the take-up reel may be placed inside the projector housing. Sufficient space has to be provided around the shaft in order to accommodate also the largest possible film reel. Consequently, the projector housing has to be enlarger and this in turn is a drawback as to weight and transportation space. The difficulties encountered in threading the film onto the core of the take-up reel are, however, still not eliminated.

The object of the invention is to create a film projector with a film rewind, which projector is to be as small as possible, is provided with a film threading means to thread the film onto the core of the take-up reel with simple means and, at least on the take-up side, requires no reel having specially constructed reel flanges and which, when constructed as a cartridge projector, requires solely the attachment of a cartridge to make the projector ready for projection.

This is accomplished according to the invention in that a pivotable reel arm is provided for the take-up reel which during the film projection is pivotally moved in dependence of the changing diameter of the film winding.

In this manner the dimensions of the housing of the projector can be kept small without having to manually move the pivotable reel arm from its rest position into an operative position. Since the reel arm according to the invention is ready for operation also in its retracted position, the film guide for threading the film can with simple means be extended very close to the take-up core. The growing film winding moves away from the mouth of the film guide due to the simultaneous swinging out of the reel arm.

According to the invention, the pivotable reel arm may be provided with a flangeless take-up core which under the action of a directional force, such as a spring, urges its cylindrical surface and the film winding formed thereon against a stationary abutment in the camera housing. In this manner the drive for the swinging movement of the reel arm is most simply derived from the growing film winding itself.

For the purpose of reducing friction and for the guidance of the growing film winding the stationary abutment according to the invention comprises a roller mounted on a stationary shaft and having preferably small guide flanges.

In a particularly effective embodiment of the invention the reel arm including the take-up core may be pivotally mounted in a slot provided in the projector housing, and when the reel arm is inside the housing, this slot may be covered by a movable flap. This flap may carry a second roller similar to the roller mounted on the stationary shaft and, being arranged in the same plane with the stationary roller, may be urged also under the action of a directional force against a point of the circumference of the growing film winding which is opposite the point where the first roller engages the film winding.

This results in a handsome compact shape of the housing. The dimensions may be such that the flap is opened only by very large film windings, while it remains closed with small windings of regular film length.

If the flap, according to a further object of the invention, has the form of a hood, it is capable of at least partly enclosing and protecting a film winding protruding from the projector housing.

These and other objects of the invention will be described in more detail in the following with reference to the accompanying drawings from which details not pertinent to the invention were omitted for the sake of clearness of the disclosure.

In the drawings:

FIG. 2 is a similar view as FIG. 1, but showing a large film winding; and

FIG. 3 is a sectional view along A—A of FIG. 1.

Figure 1:
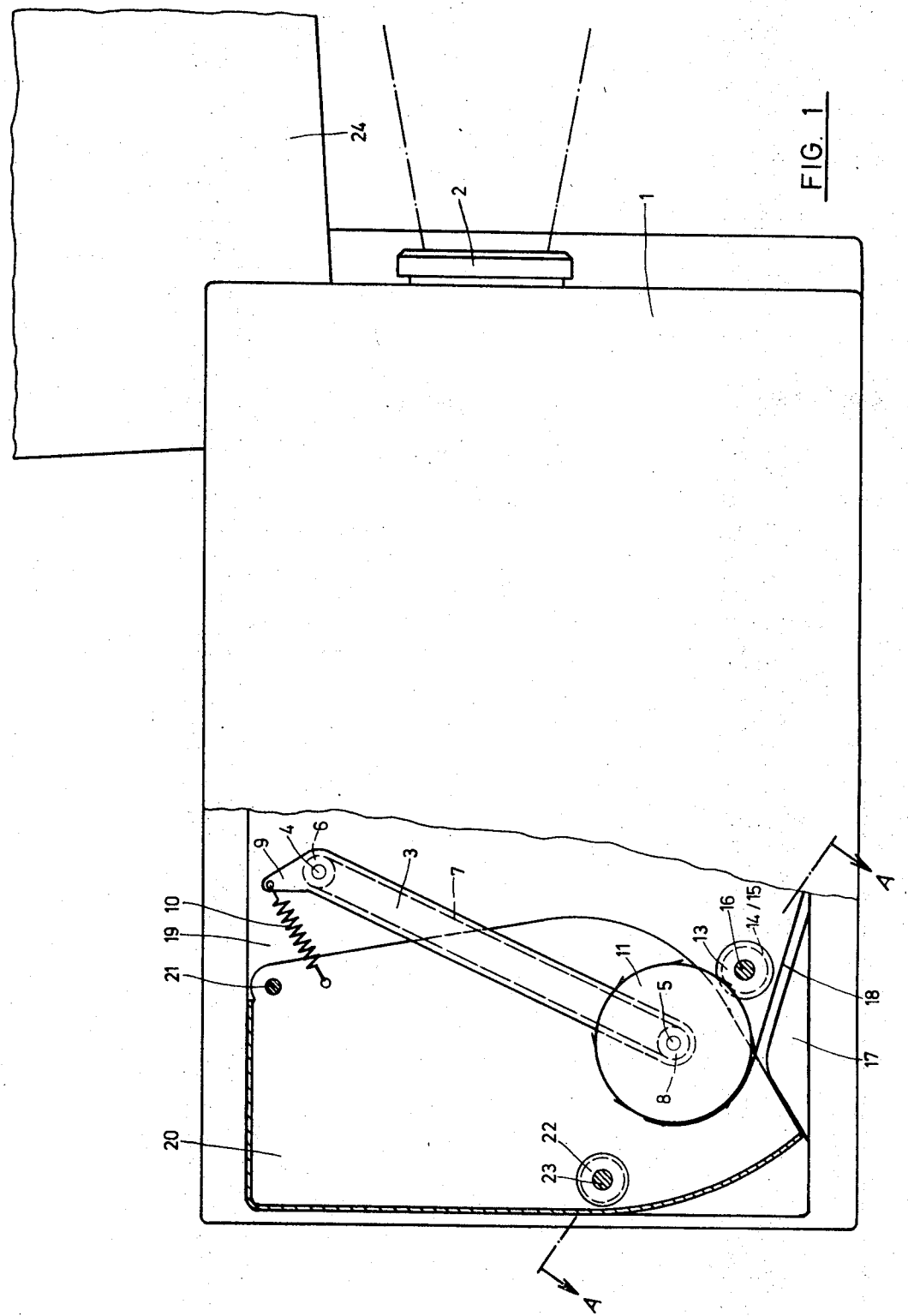
FIG. 1 is a side elevation view of a film projector according to the invention, with parts broken away.

Referring to FIG. 1, a film projector 1 having a projection objective 2 on the vertical front wall of its housing is provided with a reel arm 3 pivotally mounted on a stationary shaft 4 just below the top wall of the housing. At its free end opposite the shaft 4 the reel arm 3 carries a shaft 5 which is driven by the projector drive by means of an endless cord drive 6, 7, 8 arranged in the interior of the reel arm 3. A small upwardly projecting arm on the reel arm 3 adjacent the shaft 4 serves as a place of attachment for one end of a tension spring 10. The shaft 5 carries a take-up core 11 for a film winding 12. The take-up core 11 is associated with a roller 13 provided with small flanges 14 and 15 and supported on a stationary shaft 16 arranged in the projector housing. With 17 is designated a portion of a film guide for automatically threading the film onto the take-up core 11. 18 indicates the film strip to be wound onto the core 11. A slot 19 in the rear part of the housing 1 receives the reel arm 3 and the parts connected therewith and on its outside is covered or filled out by a hood-like flap 20. This flap 20 is pivotally attached to a stationary shaft 21 arranged below the top wall of the housing 1 and the other end of the helical spring 10 is hooked into it. The flap 2 carries a roller 22 mounted on a shaft 23 and its shape is similar to that of the roller 13. Both rollers 13 and 22 are arranged in the same vertical plane. Between them is located the take-up core 11. A film cartridge 24 containing 120 meters of film is attached to the upper right hand portion of the projector housing 1.

After the cartridge 24 has been attached to the projector housing 1 and the projector is turned on, the film strip 18 is automatically threaded into the projector by a well known guide means of which only a part is shown and is designated with 17. When the front end of the film strip has reached the guide part 17, it is seized by it and is directly conducted to the rotating take-up core 11 which catches it in known manner (FIG. 1). During the operation of the projector the film strip 18 winds itself up between the take-up core 11 and the rollers 13 and 22 thus forming a gradually growing film winding 12. With each additional turn of the winding of the film strip, the distance between the rollers 13 and 22 increases. The flap 20 pivots about the shaft 21 outwardly as soon as the film winding 12 has reached the roller 22, and the film winding 12 with the reel arm 3 follows the movement of the flap 20. FIG. 2 shows a film winding 12 containing about 120 m. of film strip.

After completion of the projection the film strip 18 in known manner is unwound from the core 11 and transported back into the cassette 24. During this rewinding operation the reel arm 3, the take-up core 11 and the film winding 12 all are moved back into the interior of the projector housing 1 and the flap 20 closes the slot 19 from the outside. Now it is only necessary to detach the cassette 24 from the projector and the latter is ready for transportation or for the projection of another film strip.

What I claim is:
1. A film projector, comprising:
   a housing having confining walls and a slot in at least one of said walls of a width exceeding the width of the film,
   a reel arm mounted in said housing for pivotal movement about an axis adjacent to one end of said reel arm,
   a film take-up core rotatably connected with said reel arm adjacent the opposite end thereof,
   abutment means in said housing adapted to limit movement of said take-up core in a direction away from said slot and to permit movement of said take-up core in the opposite direction,
   and the arrangement of said reel arm, take-up core and abutment means being such as to cause a diametrically growing film roll being wound on the take-up core to project outwardly through said slot, thereby avoiding the need for a large size housing.

2. A film projector as set forth in claim 1, including hood means pivotally mounted in said housing and being substantially U-shaped in crosssection with the leg portions one at each side of the take-up core and the leg-connecting web portion toward said slot, whereby said leg portions keep the film being wound onto the take-up core centered on said take-up core while the diametrically growing film roll causes said web portion and adjacent parts of the leg portions to move outwardly through said slot thus providing a cover for a portion of the film roll extending outwardly from said housing through said slot and in non-projecting position a closure for said slot.

3. A film projector as set forth in claim 2, including spring means interconnecting said reel arm and said hood means in such a manner as to continuously urge the take-up core in the direction toward said abutment means and said hood means toward its slot-closing position.

References Cited
UNITED STATES PATENTS

| | | | |
|---|---|---|---|
| 2,503,453 | 4/1950 | Pratt et al. | 242—76 X |
| 2,948,574 | 8/1960 | Brown. | |
| 3,163,342 | 12/1964 | Kallenberg | 242—55.11 X |
| 3,318,548 | 5/1967 | Palmer | 242—55.13 |

FOREIGN PATENTS 655,657    7/1951    Great Britain.

GEORGE F. MAUTZ, Primary Examiner

U.S. Cl. X.R.
242—197